United States Patent [19]

Hughes et al.

[11] Patent Number: 4,551,050

[45] Date of Patent: * Nov. 5, 1985

[54] THREADED ENGAGEMENT MEANS

[75] Inventors: Robert W. Hughes; James F. Cantrel, both of Northampton, Pa.

[73] Assignee: Ingersoll-Rand Company, Woodcliff, N.J.

[*] Notice: The portion of the term of this patent subsequent to Nov. 8, 2000 has been disclaimed.

[21] Appl. No.: 512,215

[22] Filed: Jul. 11, 1983

[51] Int. Cl.⁴ .................... F16B 37/12; E21B 17/042
[52] U.S. Cl. ...................................... 411/436; 411/38; 411/247; 175/320; 279/1 ME; 279/1 W; 279/100; 285/92; 285/390; 464/45
[58] Field of Search ......................... 175/320, 409, 414; 411/1, 38, 247-251, 262, 438, 436; 285/92, 390, 355, 333, 334; 403/343; 464/45-48; 279/1 ME, 1 W, 99-101

[56] References Cited

U.S. PATENT DOCUMENTS

| 2,512,316 | 6/1950 | Eckener | 411/262 |
| 2,605,850 | 8/1952 | Kiekhaefer | 464/45 |
| 2,784,428 | 3/1957 | Curran | 411/436 |
| 3,062,568 | 11/1962 | Andersen et al. | 285/333 |
| 3,396,557 | 8/1968 | Moore, Jr. | 464/46 |
| 3,687,493 | 8/1972 | Lock et al. | 285/333 |
| 3,756,628 | 9/1973 | St. Clair | 285/52 |
| 4,403,409 | 8/1977 | Walter | 175/321 |
| 4,413,689 | 11/1983 | Hughes et al. | 175/409 |

FOREIGN PATENT DOCUMENTS 673769  7/1979  U.S.S.R. .................... 411/1

Primary Examiner—Stephen J. Novosad
Assistant Examiner—Hoang C. Dang
Attorney, Agent, or Firm—Bernard J. Murphy

[57] ABSTRACT

According to a depicted embodiment thereof, the novel threaded engagement means comprises a drill rod coupling which is centrally bored and threaded to receive threaded drill rods. A stack of apertured discs, however, engages and lines the threaded bore. The discs intimately engage, and bridge between, the coupling and drill rod threads, and communicate torque therebetween. The coupling has a bearing surface or land upon which the discs are supported, and a retainer set in a recess formed in the coupling secures the disc stack in place.

18 Claims, 6 Drawing Figures

THREADED ENGAGEMENT MEANS

This invention pertains to threaded engagement means, such as nuts, couplings, studs, bolts and the like, and in particular to an improved threaded engagement means, such as the aforesaid, having means for limiting the torque transferred between said means and a complementary, threaded article with which it is threadedly engaged.

It is conventional to connect a first threaded engagement means, such as a drill rod coupling, by means of its threads, directly, in a solid contact, with the complementary threads of drill rod. When such a drill rod and coupling arrangement is used in an earth-drilling machine, the latter acts as a continuous high energy impact wrench causing the threads between the drill rod and the coupling to progressively tighten, thus increasing the tensile stress at the drill rod/coupling interface. This can result in a transverse fatigue failure of the coupling in the plane of the drill rod end. A second mode of failure can exist as a fatigue failure in the threaded drill rod. This failure can be initiated by localized thread galling. In the event that the arrangement has not failed by either of the above modes, it is possible that the combined "Torque Wrench Action" and localized thread galling can result in a threaded connection that is practically impossible to detach.

It is an object of this invention to provide an improved, threaded engagement means, such as a nut, drill rod coupling, stud or bolt, which is not subject to the aforesaid, prior art disadvantages.

It is particularly an object of this invention to set forth an improved threaded engagement means, having a body with a central axis, said body comprising means defining a first wall which is substantially smoothly threaded and of a given pitch diameter, and which circumscribes said axis, wherein the improvement comprises means engaging and lining said first wall defining a second, threaded wall, having a pitch diameter which differs from said given diameter, said second wall also circumscribing said axis; wherein said second wall has an exposed surfacing which, on a radial plane drawn outwardly from said axis, is defined by a plurality of juxtaposed, rigid surfaces; and the axial median of any one of said rigid surfaces, of a plurality thereof, measured along said radial plane, is disposed at a given distance from said axis; and the axial median of another such surface immediately adjacent to said one surface, measured along said plane, is disposed at a radial distance from said axis other than said given distance.

It is also an object of this invention to disclose an improved threaded engagement means, having a body with a central axis, said body comprising means defining a wall, substantially smoothly threaded and of a given pitch diameter, which circumscribes said axis, wherein the improvements comprises means lining and engaging said wall for engaging a second threaded engagement means and (a) for transferring torque between such threaded engagement means and (b) for limiting torque transferred therebetween.

Features of this invention comprise an improved threaded drill rod coupling which limits the torque that will be developed between it and drill rod threadedly coupled thereto. Such torque is generated by the continual "Impact Wrench" type action associated with drilling machines in normal service. Another feature of the invention proceeds from an integration of the contact between the male and female threads of a drill rod coupling and drill rods, so that the load is distributed uniformly along the threads.

Further objects and features of this invention will become more apparent by reference to the following description, taken in conjunction with the accompanying figures, in which.

Figure 1:
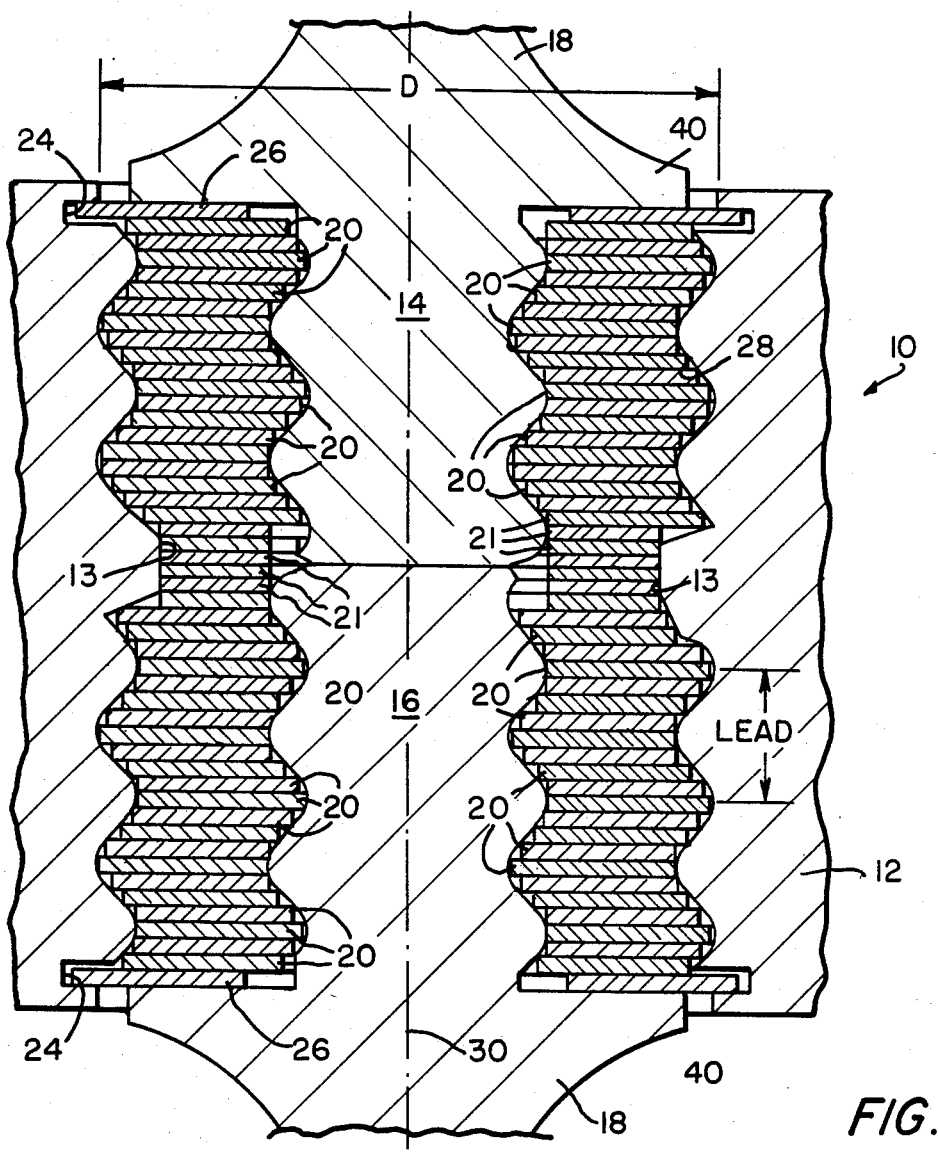
FIG. 1 is an axial cross-sectional view of confronting ends of threaded drill rods joined in a threaded coupling, according to an embodiment of the invention, showing the coupling in cross-section, and the drill rods in full line, and an interposed stack of discs.
Figure 3:
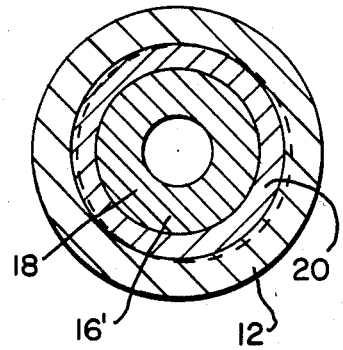
FIG. 3 is a cross-sectional view taken along section 3—3 of FIG. 2.

As shown in FIGS. 1 and 3, a first embodiment 10 of the novel, threaded engagement means comprises a drill rod coupling 12 having a bridging rib 13 formed therein intermediate the length thereof. Coupling 12 is of cylindrical conformation, and receives therein ends 14 and 16 of drill rods 18, the latter coming into abutting engagement in the plane of the bridging rib 13. Both ends 14 and 16 are threaded with a common thread, and the latter is complementary to a thread formed as the inner wall of the coupling 12. The pitch diameter of the thread of the ends 14 and 16 is significantly smaller than the pitch diameter of the thread of the inner wall of the coupling 12.

The volume between the thread of the threaded inner wall of the coupling 12, and the threads of the ends 14 and 16, is filled with a multiplicity of "washer type" discs 20 and 21. The discs 20 have an outside diameter that is slightly less than the pitch diameter of the thread of the inner wall of the coupling 12, and have a concentric inside diameter that is slightly greater than the pitch diameter of the threads of the ends 14 and 16. The discs 20 and 21 are of a ferrous material with a hardness that is less hard than the material of the drill rods 18 or the material of the coupling 12. Discs 21, too, have common outside diameters smaller than the varying diameters of the bridging rib 13, and have common inside diameters.

The bridge or bridging rib 13 serves a function well known in this art. Couplings, such as coupling 12, threaded continuously throughout their length allow one drill rod to thread through, during drilling, while the other threadedly retracts before it. This results in a diminution of the engaged or coupled length of the other drill rod, and an inadequate grip thereof by the coupling. To prevent this, the bridge or bridging rib 13, which interrupts the thread of the coupling, is provided.

The discs 20 and 21 are assembled in the space circumscribed by the inner threaded wall of coupling 12, and the outer surface of the drill rods. They orient themselves so that inside diameter thereof approximates an elemental profile of the thread, and bridge or bridging rib 13, of the inner wall of the coupling. Thus, the threads of the ends 14 and 16 are screwed into a complementary thread formed by the elementally-oriented multiplicity of discs 20; the latter, together with discs 21, define a second, threaded wall, in the coupling 12, which engages and lines the basic integral threaded wall of the coupling.

Torque from one of the ends 14 and 16 is transmitted to the other thereof through discs 20 and 21.

The tightness of the threaded connection incorporating the multiplicity of discs 20 and 21 is a function of the drill power and the available torque, and is not a function of time, as is the case in a rigid threaded connection subject to continuous "impact wrench" type torque. Thus, in essence, the torque, in this invention, attains a limited value. How this occurs is perhaps more easily understood, intuitively, by studying FIG. 1, than it is capable of explanation. If the ends 14 and 16 were directly, threadedly engageable with the coupling 12, and each end torqued up tightly in the mating threads of the coupling 12, self-evidently the engagement would be difficult to break. With time and repetitive torquing and impacting, the three joined elements would become almost as one, and the torque transfer therethrough would be substantially unlimited. The invention, however, employs the discs 20 and 21 each of which is separate from all others thereof, and each of which makes a substantially line-type contacting engagement with the threads of the coupling 12 and the threads of the ends 14 and 16. The flat edges of the discs 20 and 21 cannot conformingly blend into the undulating thread surfaces and exhibit an assimilative, lock-up engagement therewith. The full complement of discs 20 and 21 defines a mass of metal, between the ends 14 and 16, and the coupling 12, so that any necessary rotary torque (and impact) can be transferred therethrough, but the disc mass comprises loose, separate pieces, each independent of all the others. Accordingly, no matter how tightly the FIG. 1 arrangement is torqued (and impacted), untorquing is very simple; the disc mass is substantially amorphous and, when untorqued, loosens or unconsolidates most readily. Thus, the invention avoids the lock-up type of torqued engagement commonly associated with standard drill rods and couplings (or with lug nuts on vehicle wheels), and readily accommodates a quick free disengagement.

The ability of the elemental discs 20 and 21 to individually longitudinally orient themselves in response to an applied load, in conjunction with the space available to accommodate local disc deformation, provides the ability to integrate the thread loading throughout the length of the threads.

Means are provided for retaining the discs 20 and 21 in the coupling 12. Such retention is accomplished first by providing "low stress" undercuts 24 in adjacency to each end of the coupling 12. Then, a retainer 26 is employed, in each of the undercuts, to secure the discs 20 and 21 in place. In this embodiment the retainers 26 are split, resilient retaining rings. Alternatively, deformable, Belleville washer-type spacers, having an outside diameter that is greater than the nominal diameter "D" of the coupling bore 28, but less than the diameter of the "low stress" undercuts 24 can be used.

The drill rods have compression flanges 40 which come into fast, compressive engagement with the retainers 26. By this means the discs 20 and 21 are formed into a tight mass simulative of a homogenous metal lining. Hence, rotary torque and impact forces can be readily transmitted therethrough.

Figure 2:
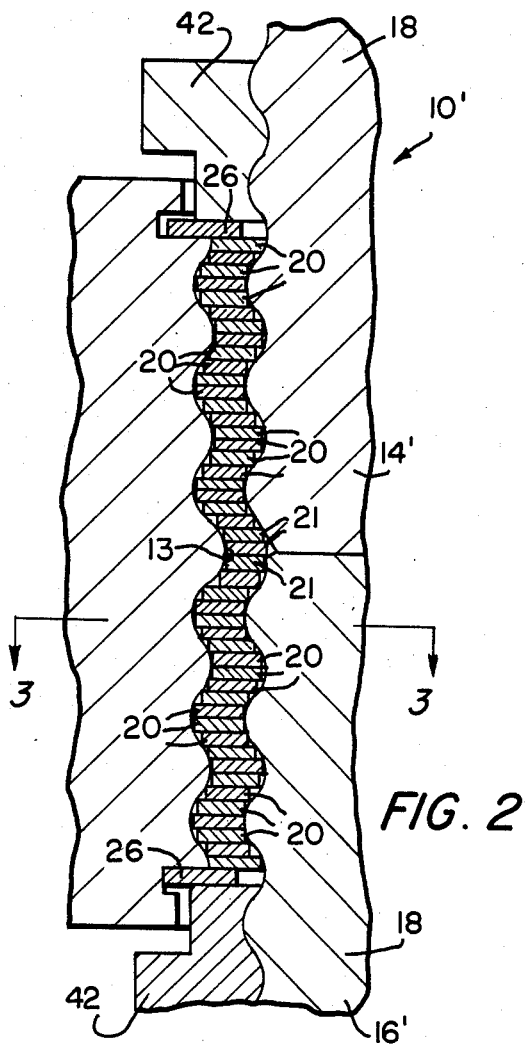
FIG. 2 is a partial, axial, cross-sectional view of an alternative embodiment of joined threaded drill rods and coupling, according to the invention.

In the alternative embodiment 10' of FIG. 2, the flanges 40 are not necessary and, accordingly, the coupling 12 can be employed with standard drill rods. In this embodiment, compression nuts 42 are first threaded back onto the ends 14' and 16' of the drill rods. Then the ends 14' and 16' are threaded into the coupling 12, and the compression nuts 42 are tightened against the retainers 26.

Figure 1A:
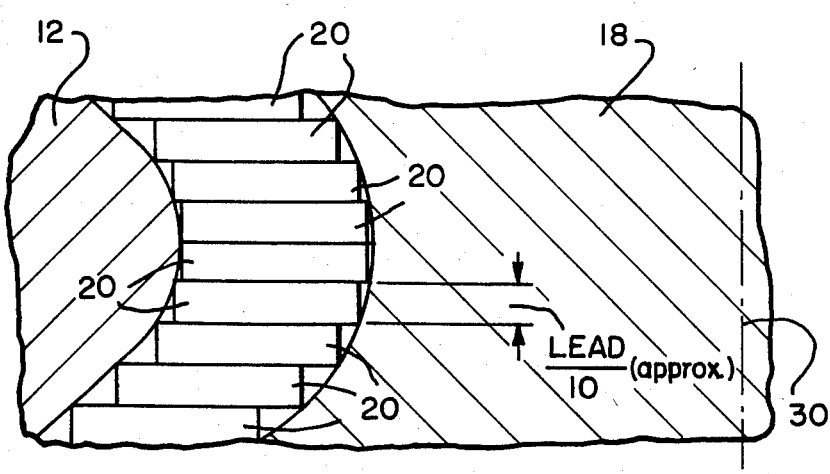
FIG. 1A is an enlarged detail of a portion of the coupling, discs, and one of the drill rods.

As can be seen in FIGS. 1 and 2 the discs 20 and 21 present individual, rigid surfaces to the confronting threads and said individual, rigid surfaces are parallel to the axis 30 of the coupling 12. The discs 20 are all identical, having common outside and inside diameters, and each is freely rotatable, in the coupling 12. The discs 21 define a bridging set, of reduced outside diameter and greater inside diameter, which serves as a spacer to accommodate the bridge or bridging rib 13. The thread of the inner wall of the coupling 12 has a given lead dimension and the discs 20 and 21 each have a thickness which is approximately one tenth of the lead dimension. In FIG. 1, for instance (and also in FIGS. 2, 4 and 5) the discs 20 and thread forms are not illustrated with precision. Rather, they are representative of the inventive embodiments. Hence, some of the discs 20, as drawn, do not appear to be of common dimensions. FIG. 1A, however, is a true representation of the novel practice; here, as can be seen, the discs 20 are identical in all dimensions, pursuant to the preferred teaching of this invention.

It is a criterion of the invention that the aforesaid individual, inner and outer rigid surfaces of the discs 20 and 21 mate with the confronting threads and bridging rib 13 of the coupling 12, and drill rod ends 14 and 16. More, the axial median of any one of the aforesaid surfaces, on a vertical plane drawn outwardly from the axis 30, shall be at a given radial distance from the axis 30 of the coupling 12 which is different from the radial distance, from the axis 30, of the axial median of one other such surface immediately adjacent thereto. This is shown in FIG. 1A.

Figure 4:
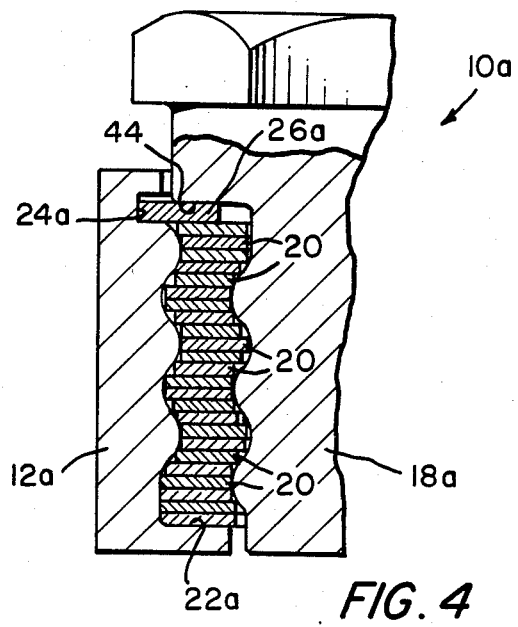
FIG. 4 is a cross-sectional view, similar to FIG. 1, illustrative of a nut, embodying the invention, shown in engagement with a complementary bolt.

FIG. 4 depicts an alternative embodiment 10a of the invention in a practice thereof with a nut 12a and a bolt 18a having a compression shoulder 44. Here, discs 20 engage and line the inner threaded wall of the nut, the stack thereof setting upon an inwardly-directly land 22a formed at one end of the nut 12a. As in the coupling 12 of FIGS. 1 and 2, the nut 12a has an annular recess 24a formed therein which receives a split, resilient retainer 26a. The retained stack of discs 20 within the nut 12a defines a second, threaded wall in the nut which threadedly receives a threaded stud or bolt.

Figure 5:
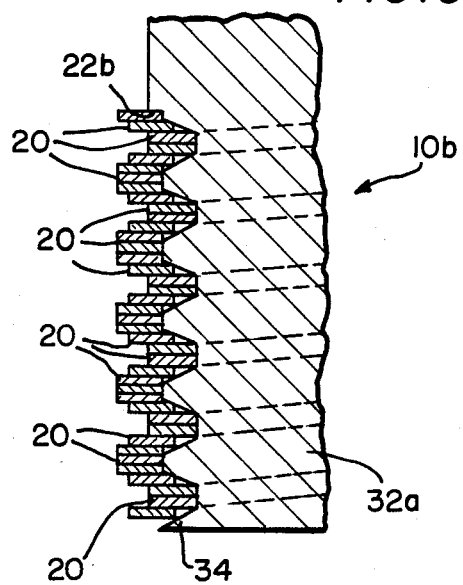
FIG. 5 is a partial cross-sectional view of a bolt embodying the invention.

A complementary practice of the invention, as depicted in FIG. 5 by an alternative embodiment 10b, may be employed. Discs 20, now, engage and line the outer, threaded shank or wall of a stud or bolt 32a. An uppermost disc 20 in the stack thereof sets against a land or shoulder 22b. The stack of discs is held in place on the stud or bolt 32a by a peening-over of the lowermost end 34 of the latter. It will be appreciated that such a disclined stud or bolt 32a will be readily received in a nut or threaded bore having a complementary pitch diameter thread.

While we have described our invention in connection with specific embodiments thereof, it is to be clearly understood that this is done only by way of example and not as a limitation to the scope of our invention, as set forth in the objects thereof, and in the appended claims.

We claim:

1. An improved threaded engagement means, having a body with a central axis, said body comprising means defining a first wall which is substantially smoothly threaded, and of a given pitch diameter, and which circumscribes said axis, wherein the improvement comprises:
- means engaging and lining said first wall defining a second, threaded wall, having a pitch diameter which differs from said given diameter, which also circumscribes said axis; wherein
- said second wall has an exposed surfacing which, on a radial plane drawn outwardly from said axis, is defined by a plurality of juxtaposed, rigid surfaces; and
- the axial median of any one of said rigid surfaces, of a plurality thereof, measured along said radial plane, is disposed at a given distance from said axis; and
- the axial median of another such surface immediately adjacent to said one surface, measured along said plane, is disposed at a radial distance from said axis other than said given distance.

2. An improved threaded engagement means, according to claim 1, wherein:
said juxtaposed surfaces are all parallel with said axis.

3. An improved threaded engagement means, according to claim 1, wherein:
said engaging and lining means is formed of a plurality of apertured discs.

4. An improved threaded engagement means, according to claim 3, wherein:
a plurality of said discs all have a common outside diameter and a common inside diameter.

5. An improved threaded engagement means, according to claim 3, wherein:
said first wall has a thread lead of a given dimension X; and
each of said discs has a thickness of approximately X/10.

6. An improved threaded engagement means, according to claim 1, wherein:
said body and said engaging and lining means have means cooperative for retaining said elements in engagement with said body.

7. An improved threaded engagement means, according to claim 6, wherein:
said cooperative retaining means comprises a retainer; and
said body has means for securing said retainer therewithin.

8. An improved threaded engagement means, according to claim 7, wherein:
said securing means comprises a relief formed in said body.

9. An improved threaded engagement means, having a body with a central axis, said body comprising means defining a first wall which is substantially smoothly threaded and of a given pitch diameter, and which circumscribes said axis, wherein the improvement comprises:
- means engaging and lining said first wall defining a second, threaded wall, having a pitch diameter which differs from said given diameter, said second wall also circumscribing said axis; wherein
- said engaging and lining means comprises a plurality of individual, rigid, circular elements; and
- each of said elements is freely rotatable relative to any other thereof.

10. An improved threaded engagement means, according to claim 9, wherein
a plurality of said elements are substantially identical.

11. An improved threaded engagement means, according to claim 9, wherein:
each of said elements has an aperture formed therethrough centrally thereof;
said apertures of a plurality of said elements are of a common dimension; and
a plurality of said apertures are eccentrically disposed relative to said axis.

12. An improved threaded engagement means, according to claim 9, wherein:
said body comprises a drill rod coupling;
said body has an axial, walled bore formed therethrough; and
said wall of said bore comprises said first wall.

13. An improved threaded engagement means, according to claim 12, wherein:
said circular elements are confined within said bore.

14. An improved threaded engagement means, according to claim 13, wherein:
said body further has a recess formed in said wall of said bore; and further including
retainer means, nested in said recess, retaining said elements within said bore.

15. An improved threaded engagement means, according to claim 9, wherein:
said body comprises a nut;
said nut has an axial, walled bore formed therein; and
said wall of said bore comprises said first wall.

16. An improved threaded engagement means, according to claim 15, wherein:
said circular elements are confined within said bore.

17. An improved threaded engagement means, according to claim 16, wherein:
said nut further has a recess formed in said wall of said bore; and further including
retainer means, nested in said recess, for retaining said elements within said bore.

18. An improved threaded engagement means, according to claim 15, wherein:
said nut further has an annular land, at one end thereof, extending inwardly relative to, and circumscribing said axis.

* * * * *